US009420414B2

(12) United States Patent
Duan

(10) Patent No.: US 9,420,414 B2
(45) Date of Patent: Aug. 16, 2016

(54) METHOD AND APPARATUS FOR POSITIONING MOBILE TERMINAL

(71) Applicant: DATANG MOBILE COMMUNICATIONS EQUIPMENT CO., LTD, Beijing (CN)

(72) Inventor: Jianghai Duan, Beijing (CN)

(73) Assignee: Datang Mobile Communications Equipment Co., Ltd, Beijing (CN)

( * ) Notice: Subject to any disclaimer, the term of this patent is extended or adjusted under 35 U.S.C. 154(b) by 0 days.

(21) Appl. No.: 14/426,150

(22) PCT Filed: Aug. 2, 2013

(86) PCT No.: PCT/CN2013/080741
§ 371 (c)(1),
(2) Date: Mar. 4, 2015

(87) PCT Pub. No.: WO2014/036874
PCT Pub. Date: Mar. 13, 2014

(65) Prior Publication Data
US 2015/0208198 A1    Jul. 23, 2015

(30) Foreign Application Priority Data
Sep. 4, 2012 (CN) .......................... 2012 1 0324618

(51) Int. Cl.
*H04W 4/02* (2009.01)
*H04W 64/00* (2009.01)
*G01S 5/02* (2010.01)

(52) U.S. Cl.
CPC .. *H04W 4/02* (2013.01); *G01S 5/02* (2013.01); *G01S 5/0268* (2013.01); *H04W 64/00* (2013.01)

(58) Field of Classification Search
CPC ......... H04W 64/00; G01S 5/02; G01S 5/0268
See application file for complete search history.

(56) References Cited

U.S. PATENT DOCUMENTS

| 2005/0239475 | A1* | 10/2005 | Voltolina | H04W 64/00 455/456.1 |
| 2012/0142328 | A1* | 6/2012 | Awoniyi | H04W 36/22 455/418 |
| 2013/0170383 | A1* | 7/2013 | Cho | H04W 64/003 370/252 |

FOREIGN PATENT DOCUMENTS

| CN | 101521901 A | 9/2009 |
| CN | 102104955 A | 6/2011 |
| CN | 102858010 A | 1/2013 |
| WO | WO 2011/099909 A1 | 8/2011 |

OTHER PUBLICATIONS

PCT International Search Report for PCT Counterpart Application No. PCT/CN2013/080741, 5 pp. (including English translation), (Nov. 7, 2013).

(Continued)

*Primary Examiner* — Lester Kincaid
*Assistant Examiner* — Daniel G Bassett
(74) *Attorney, Agent, or Firm* — Blakely, Sokoloff, Taylor & Zafman LLP

(57) ABSTRACT

The present application relates to a wireless communications technology and discloses a method and an apparatus for positioning a mobile terminal. The method specifically comprises: according to a first request message sent by a CN for instructing positioning of a mobile terminal, an RNC sending, to a base station of the mobile terminal, a second request message for instructing acquisition of the number of identifications of sub areas associated with the mobile terminal in a cell dividing result, the cell dividing result comprising a plurality of sub areas acquired by division according to an antenna group coverage manner of the base station in a cell the mobile terminal is currently located in; the RNC receiving an identification returned by the base station, of at least one sub area associated with the mobile terminal; and the RNC sending, to an SAS, a PCAP calculation request message carrying the identification of the at least one sub area, and enabling the SAS to determine geographical location information of the mobile terminal according to the identification of at least one sub area, thereby implementing precise positioning of the mobile terminal.

16 Claims, 6 Drawing Sheets

(56) References Cited

OTHER PUBLICATIONS

PCT Written Opinion of the International Searching Authority for PCT Counterpart Application No. PCT/CN2013/080741, 12 pp. (including English translation), (Nov. 7, 2013).

3GPP, "$3^{rd}$ Generation Partnership Project; Technical Specification Group Radio Access Network; UTRAN Iupc Interface Positioning Calculation Application Part (PCAP) Signaling (Release 10)", 3GPP TS 25.453, V10.3.0, 8 pp., (Jun. 2011).

\* cited by examiner

--Prior Art--

--Prior Art--

--Prior Art--

--Prior Art--

| Bit 7(Bit) | | Bit 0(Bit) |
|---|---|---|
| PF frame header check value | | FT(Frame type) |
| (PF frame header check value) | (Frame sequence number) | |
| Reserved bits | Number of sub-frames | |
| Connection frame number | | |
| E-DCH UE buffer size | | |
| E-DCH UE buffer size | | |
| eUB size (size) | Reserved bits | Number of MAC-is SDU |
| Number of MAC-is SDU | | |
| E-DCH radio network indication | | |
| E-DCH radio network indication | | |
| Reserved bits | First sub-frame number | Number of MAC-is PDU |
| ∘ ∘ ∘ | | |
| Reserved bits | Last sub-frame number | Number of MAC-is PDU |
| First MAC-is PDU descriptor in the first sub-frame | | |
| ∘ ∘ ∘ | | |
| Last MAC-is PDU descriptor in the first sub-frame | | |
| ⋮ | | |
| First MAC-is PDU descriptor in the last sub-frame | | |
| ∘ ∘ ∘ | | |
| Last MAC-is PDU descriptor in the last sub-frame | | |
| First MAC-is PDU in the first sub-frame | | |
| ∘ ∘ ∘ | | |
| Last MAC-is PDU in the first sub-frame | | |
| ⋮ | | |
| First MAC-is PDU in the last sub-frame | | |
| ∘ ∘ ∘ | | |
| Last MAC-is PDU in the last sub-frame | | |
| Newly added IE flag7(E)  6  5  4  3  2  1  0 | | |
| Cell portion ID | | |
| Reserved bits | | Angle of arrival |
| Angle of arrival | | |
| Reserved bits | Extended uplink preamble RX Timing Deviation | |
| Extended uplink preamble RX Timing Deviation | | |
| Reserved extension | | |
| FP frame payload check value | | |
| FP frame payload check value | | |

Fig.4

--Prior Art--

METHOD AND APPARATUS FOR POSITIONING MOBILE TERMINAL

CROSS-REFERENCE TO RELATED APPLICATIONS

This patent application is a U.S. National Phase Application under 35 U.S.C. §371 of International Application No. PCT/CN2013/080741, filed on Aug. 2, 2013, designating the United States, and claiming priority to Chinese Patent Application No. 201210324618.4, filed with the State Intellectual Property Office of the People's Republic of China on Sep. 4, 2012, and entitled "Method and apparatus for positioning mobile terminal", which was incorporated by reference in its entirety.

FIELD OF THE DISCLOSURE

The present disclosure relates to the field of wireless communications and particularly to a method and a device for positioning a mobile terminal.

BACKGROUND OF THE DISCLOSURE

At present, there are more and more position services based upon the location of a mobile terminal, with the development of mobile communication technologies and a growing demand for the services. The location-based services relate to traffic, logistics, securities, emergences, daily life and other various fields and can provide navigation, logistical management, traffic information, schedules and other numerous services and thus have been widely applied.

In a system for positioning a mobile terminal, position calculation is typically performed for the mobile terminal based on signal strength, a carrier phase, a measured angle at which a signal arrives and time of arrival measurement, and a combination thereof. At present the mobile terminal can be positioned in two approaches, that is, it can be positioned in the control plane or in the user plane. The mobile terminal is positioned in the control plane by use of a signalling link between a Radio Network Controller (RNC) and a Core Network (CN), particularly as follows: the CN transmits a position request to the RNC to trigger a position process, and the RNC sends a position result to the CN after the mobile terminal is positioned, wherein the CN, the RNC and a Node B are involved in the position process; and the mobile terminal is positioned, in such a way that the mobile communication device communicates with a position server, over an Internet Protocol (IP) link, without modifying the existing infrastructure of a mobile communication network, that is, the position process relates to an access to a Packet Switched (PS) domain service for the RNC and the Node B, and all of position control signalling and measurement data is exchanged directly between a position control center of a core network and a User Equipment (UE).

In the prior art there are generally the following position schemes based on, e.g., a Cell Identity (ID), an Observed Time Difference of Arrival (OTDOA), an Assisted Global Position System (A-GPS), etc.

The several existing position schemes will be described below.

1. Position Scheme based on a Cell ID:

In the position scheme based on a cell ID (i.e., the coverage area of a cell), the ID of a cell where the mobile terminal resides is determined, and further the mobile terminal is positioned by the longitude and the latitude of the cell, that is, the precision of position is generally decided by the radius of the cell. This scheme is easy to implement with a short response time by occupying a small number of resources at the cost of a low precision of position.

2. Position Scheme based on OTDOA:

In the position scheme based on OTDOA, the location of the mobile terminal is determined by detecting the time difference of arrival of signals from two Node Bs, and the measurement quantity is System Frame Numbers (SFNs)–SFN Observed Time Difference, which is measured by the UE. The position scheme based on OTDOA involves more than three Node B's measuring the position parameters concurrently for a higher precision of position.

3. A-GPS Position Scheme:

In the A-GPS position scheme, the mobile terminal is provided with assistance GPS information over the network, the mobile terminal captures a satellite and receives measurement information, and then the mobile terminal calculates the location thereof or transmits the measurement information to the network, and the network calculates the location of the mobile terminal. The mobile terminal is specially required in the A-GPS position scheme that the mobile terminal has to be provided with a GPS module therein. The A-GPS position scheme has a high precision of position outdoors but has a low precision of position and even does not work indoors or in a shielded environment.

Moreover there is also such a TA plus AOA position scheme specific to a Time Division Synchronized Code Division Multiple Access (TD-SCDMA) system, that location calculation is performed for the mobile terminal by using an Angle of Arrival (AOA), a RX Timing Deviation (RxTD), a Timing Advance (Tadv) and other measurement parameters, wherein Tadv is measured by the UE, and the AOA and the RxTD are measured by the Node B.

A Stand-alone Serving Mobile Location Center (SMLC) (SAS) network element has been introduced to the $3^{th}$ Generation Partnership (3GPP) Standard Release 5 (R5), to function as a Position Calculation Application Part (PCAP) in the network architecture as illustrated in FIG. 1. A logical interface between the SAS and the RNC is an Iupc interface, generally configured to transmit messages related to position information of the UE between the RNC and the SAS.

In the 3GPP Standard R5, the PCAP function can only be performed in the A-GPS position scheme. Since the R6, the PCAP function can also be performed in the cell ID-based position scheme, the OTDOA-based position scheme, the TA plus AOA position scheme and the other various position schemes.

Referring to FIG. 2A, a flow of performing the PCAP function in the OTDOA-based position scheme includes the following operations:

Operation a1: The CN transmits a position request message to the RNC;

Operation b1: The RNC transmits a measurement control message to the UE, to request the UE for an OTDOA-related measurement, and the OTDOA-related measurement quantity is an SFN-SFN Observed Time Difference;

Operation c1: The UE sends a measurement report carrying an OTDOA-related measurement result to the RNC;

Operation d1: The RNC transmits a PCAP calculation request message carrying the OTDOA-related measurement information to the SAS via the Iupc interface;

Operation e1: The SAS performs position calculation according to the carried related measurement information, derives geographical location information of the UE, and sends a PCAP calculation response message carrying a result of calculating the location of the UE to the RNC via the Iupc interface; and Operation f1: The RNC sends a position result to the CN.

Referring to FIG. 2B, a flow of performing the PCAP function in the TA plus AOA position scheme includes the following operations:

Operation a2: The CN transmits a position request message to the RNC;

Operation b2: The RNC transmits a measurement control message to the UE, to request the UE for Tadv measurement;

Operation c2: The UE sends a measurement report carrying a Tadv measurement result to the RNC;

Operation d2: The RNC transmits a dedicated measurement request message to the Node B to request the Node B for RxTD measurement and AOA measurement;

Operation e2: The Node B sends a dedicated measurement report carrying RxTD measurement and AOA measurement results to the RNC;

Operation f2: The RNC transmits a PCAP calculation request message carrying Tadv, RxTD and AOA related measurement information to the SAS via the Iupc interface;

Operation g2: The SAS performs position calculation according to the carried related measurement information, derives geographical location information of the UE, and sends a PCAP calculation response message carrying a result of calculating the location of the UE to the RNC via the Iupc interface; and Operation h2: The RNC sends a position result to the CN.

In a practical application, the related measurement information in the dedicated measurement report message sent by the Node B is as depicted in Table 1:

TABLE 1

| Information element/<br>group name | Optional or<br>required | Range | Note |
|---|---|---|---|
| Selected dedicated<br>measurement type | Required | | |
| >Signal to interference<br>ratio | | | |
| >Transmit code power | | | |
| >Additional dedicated<br>measurement type | | | |
| >>Rx timing deviation | Required | | Applicable to<br>1.28 Mcps TDD. |
| >>>Rx timing deviation | | | |
| >>Angle of arrival | | | Applicable to<br>1.28 Mcps TDD. |
| >>>Angle of arrival | Required | | |
| >>> Required precision<br>of angle of arrival | Required | | |
| >>Best cell portions | | | Applicable to<br>1.28 Mcps TDD. |
| >>>Best cell portions | Required | | |

Information contents of the best cell portions are as depicted in Table 2:

TABLE 2

| Information element/<br>group name | Optional or<br>required | Range | Note |
|---|---|---|---|
| Best cell portion | | 1 ... <The largest number<br>of best cell portions> | |
| >Cell portion identifier | Required | | |
| >Received signal code<br>power | Required | | |

In a practical application, contents of the PCAP calculation request message are as depicted in Table 3:

TABLE 3

| Information element/<br>group name | Optional or<br>required | Range | Note |
|---|---|---|---|
| Message type | | | |
| Transaction identifier | Required | | |
| Initial UE location estimation | Optional | | |
| GPS measurement result | | 0 ... 3 | |
| >GPS measurement result | Required | | |
| Measurement result set based<br>on cell identifier | | 0 ... 16 | |
| >Measurement result information<br>list based on cell identifier | Required | | |
| OTDOA measurement group | | 0 ... 1 | |
| >OTDOA reference cell information | | | |
| >OTDOA adjacent cell list information | | 1 ... 32 | |
| >>OTDOA adjacent cell information | Required | | |
| >OTDOA measurement result set | | 1 ... 16 | |
| >>OTDOA measurement result<br>information list | | | |

In a practical application, contents of the measurement result information list based on cell identifier are as depicted in Table 4:

TABLE 4

| Information element/<br>group name | Optional or<br>required | Range | Note |
|---|---|---|---|
| Measurement result<br>information based on cell<br>identifier | | 1 ... 32 | |
| >Measured cell identifier | Required | | |
| >Node B antenna<br>geographical location<br>information | Required | | |
| >Rx timing deviation<br>information | | 0 ... 1 | Applicable to<br>1.28 Mcps TDD. |
| >>Rx timing deviation | Required | | |
| >>Timing advance | Required | | |
| >>Extended timing advance | Optional | | |
| >Path loss | Optional | | |
| >Angle of arrival | | 0 ... 1 | Applicable to<br>1.28 Mcps TDD. |
| >Angle of arrival | Required | | |
| >Required precision of<br>angle of arrival | Required | | |

In a practical application, contents of the PCAP calculation response message are as depicted in Table 5:

TABLE 5

| Information element/<br>group name | Optional or<br>required | Range | Note |
|---|---|---|---|
| Message type | Required | | |
| Transaction identifier | Required | | |
| UE location estimation | Required | | |

Along with the development of third generation mobile communications, a Node B tends to be designed by separating a baseband from radio frequencies, and a baseband remote Node B is such a Node B with a baseband separate from a radio frequencies. The Baseband remote Node B is configured with multiple sets of distributed antennas for coverage. A cell portion as defined to be covered by each specific set of antenna can be identified by a cell portion identifier. Thus there may be multiple cell portions of a cell. The RNC determines in which cell portion the mobile terminal is located in the following two approaches:

First Approach:

The mobile terminal has an initial access through the Up Link Frame Protocol (UL FP) of the user plane. The Node B can carry information about a cell portion where the UE is located through the Random Access Channel Frame Protocol (RACH FP) or the Enhanced Uplink Dedicated Channel Frame Protocol (E-DCH FP). FIG. 3 particularly illustrates a format of the RACH FP, wherein for the 1.28 Mcps TDD system, Bit 3 of New IE Flag indicates whether there is a Cell Portion Low Chip Rate (LCR) IE, and particularly 1 indicates that there is a Cell Portion LCR IE, and 0 indicates that there is no Cell Portion LCR IE; and FIG. 4 particularly illustrates a format of the E-DCH FP, wherein for the 1.28 Mcps TDD system, Bit 0 of New IE Flag indicates whether there is a Cell Portion LCR ID IE, and particularly 1 indicates that there is a Cell Portion LCR ID IE, and 0 indicates that there is no Cell Portion LCR ID IE.

Second Approach:

The initially accessing mobile terminal makes a dedicated measurement report through the Node B. After the terminal accesses, the RNC can initiate a Node B dedicated measurement in the measurement type of Best Cell Portions, request the Node B for reporting a Cell Portion of which the UE is located, and support three report modes including a periodical report, an immediate report and a change report, as depicted in Table 6.

TABLE 6

| | Report characteristic type | | | | | | | | |
|---|---|---|---|---|---|---|---|---|---|
| Dedicated measurement type | Immediate report | Periodical report | Event A-mode report | Event B-mode report | Event C-mode report | Event D-mode report | Event E-mode report | Event F-mode report | Change report |
| Best cell portion | X | X | | | | | | | X |

It can be seen from above, the RNC can obtain initial location information of the mobile terminal and update location information of the mobile terminal in real time, in the two approaches above. The RNC can position the mobile terminal more precisely, based upon the information about the best cell portion where the mobile terminal is located, but in the latest 3GPP Standard R10, the cell portion information (i.e., the information about the division of the cell into the cell portions) has not been introduced into the PCAP calculation request message of the Iupc interface so far, that is, the PCAP function based upon the cell portion information can not be performed in the existing standard to position the mobile terminal more precisely.

SUMMARY OF THE DISCLOSURE

Embodiments of the present disclosure provide a method and a device for positioning a mobile terminal, so as to address the problem in the prior art of the impossibility to position the mobile terminal precisely.

A method for positioning a mobile terminal, which includes:

in response to a first request message transmitted by a Core Network (CN) for positioning of a mobile terminal, transmitting, by a Radio Network Controller (RNC) to a Node B serving the mobile terminal a second request message, for retrieving a number of identifiers of cell portions associated with the mobile terminal in a cell division result, wherein the cell division result includes a plurality of cell portions obtained by dividing the cell where the mobile terminal is currently located, according to a coverage pattern of an antennas group of the Node B;

receiving, by the RNC, an identifier of at least one cell portion associated with the mobile terminal sent by the Node B; and transmitting, by the RNC, to a Stand-alone Serving Mobile Location Center (SAS) a Position Calculation Application Part (PCAP) calculation request message, carrying the identifier of the at least one cell portion, to enable the SAS to determine geographical location information of the mobile terminal according to the identifier of the at least one cell portion.

A method for positioning a mobile terminal, which includes:

receiving, by a Stand-alone Serving Mobile Location Center (SAS), a Position Calculation Application Part (PCAP) calculation request message, transmitted by a Radio network controller (RNC), carrying an identifier of at least one cell portion associated with a mobile terminal in a cell division result, wherein the cell division result includes a plurality of cell portions obtained by dividing the cell where the mobile terminal is currently located, according to a coverage pattern of an antennas group of a Node B; and determining, by the SAS, geographical location information of the mobile terminal according to the identifier of the at least one cell portion.

A device for positioning a mobile terminal, which includes:

a first communicating component configured, in response to a first request message transmitted by a Core Network (CN) for positioning of a mobile terminal, to transmit a Node B serving the mobile terminal a second request message, for retrieving a number of identifiers of cell portions associated with the mobile terminal in a cell division result, wherein the cell division result includes a plurality of cell portions obtained by dividing the cell where the mobile terminal is currently located, according to a coverage pattern of an antennas group of the Node B;

a receiving component configured to receive the identifier of at least one cell portion associated with the mobile terminal sent by the Node B; and a second communicating component configured to transmit to a Stand-alone Serving Mobile Location Center (SAS) a Position Calculation Application Part (PCAP) calculation request message, carrying the identifier of the at least one cell portion, to enable the SAS to determine geographical location information of the mobile terminal, according to the identifier of the at least one cell portion.

A device for positioning a mobile terminal, which includes:

a communicating component configured to receive a Position Calculation Application Part (PCAP) calculation request message, transmitted by a Radio network controller (RNC), carrying an identifier of at least one cell portion associated with a mobile terminal in a cell division result, wherein the cell division result includes a plurality of cell portions obtained by dividing the cell where the mobile terminal is currently located, according to a coverage pattern of an antennas group of a Node B; and a determining component configured to determine geographical location information of the mobile terminal, according to the identifier of the at least one cell portion.

In embodiments of the present disclosure, in response to the first request message transmitted by the CN for positioning of the mobile terminal, the RNC transmits to the Node B serving the mobile terminal a second request message, for retrieving the number of identifiers of the cell portions associated with the mobile terminal in the cell division result, wherein the cell division result includes multiple cell portions obtained by dividing the cell where the mobile terminal is currently located, according to the coverage pattern of an antennas group of a Node B; the RNC receives the identifier of the at least one cell portion associated with the mobile terminal sent by the Node B; and the RNC transmits to the SAS the PCAP calculation request message, carrying the identifier of the at least one cell portion, to enable the SAS to determine geographical location information of the mobile terminal, according to the identifier of the at least one cell portion, to thereby position the mobile terminal precisely.

BRIEF DESCRIPTION OF THE DRAWINGS

FIG. 4 illustrates the E-DCH FP format in the prior art;

DETAILED DESCRIPTION OF THE EMBODIMENTS

In order to position a mobile terminal accurately, an embodiment of the present disclosure proposes a method for positioning a mobile terminal, particularly as follows: in response to a first request message transmitted by a CN for positioning of a mobile terminal, an RNC transmits to a Node B serving the mobile terminal a second request message, for retrieving the number of identifiers of cell portions associated with the mobile terminal in a cell division result, wherein the cell division result includes multiple cell portions obtained by dividing the cell where the mobile terminal is currently located, according to a coverage pattern of the antennas group of the Node B; the RNC receives the identifier of at least one cell portion associated with the mobile terminal sent by the Node B; and the RNC transmits to an SAS a PCAP calculation request message carrying the identifier of the at least one cell portion, so that the SAS determines geographical location information of the mobile terminal, according to the identifier of the at least one cell portion, to thereby position the mobile terminal precisely.

Preferred embodiments of the present disclosure will be described below in details with reference to the drawings.

Figure 1:
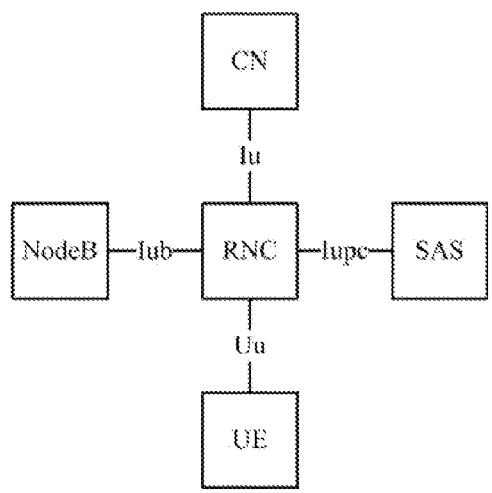
FIG. 1 illustrates a schematic diagram of the network architecture in the prior art.
Figure 2A:
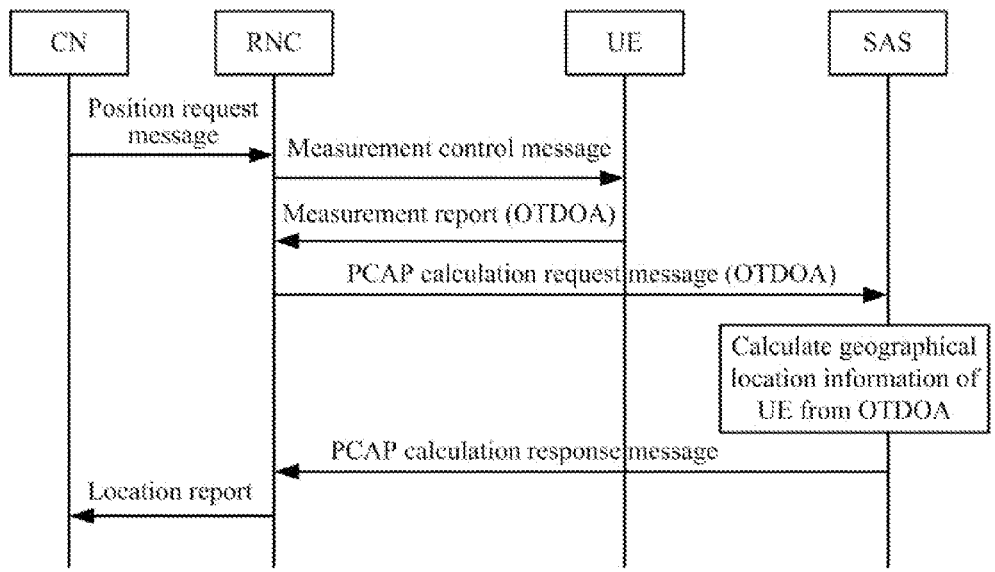
FIG. 2A illustrates a detailed flow chart of implementing the PCAP function in the OTDOA position scheme in the prior art.
Figure 2B:
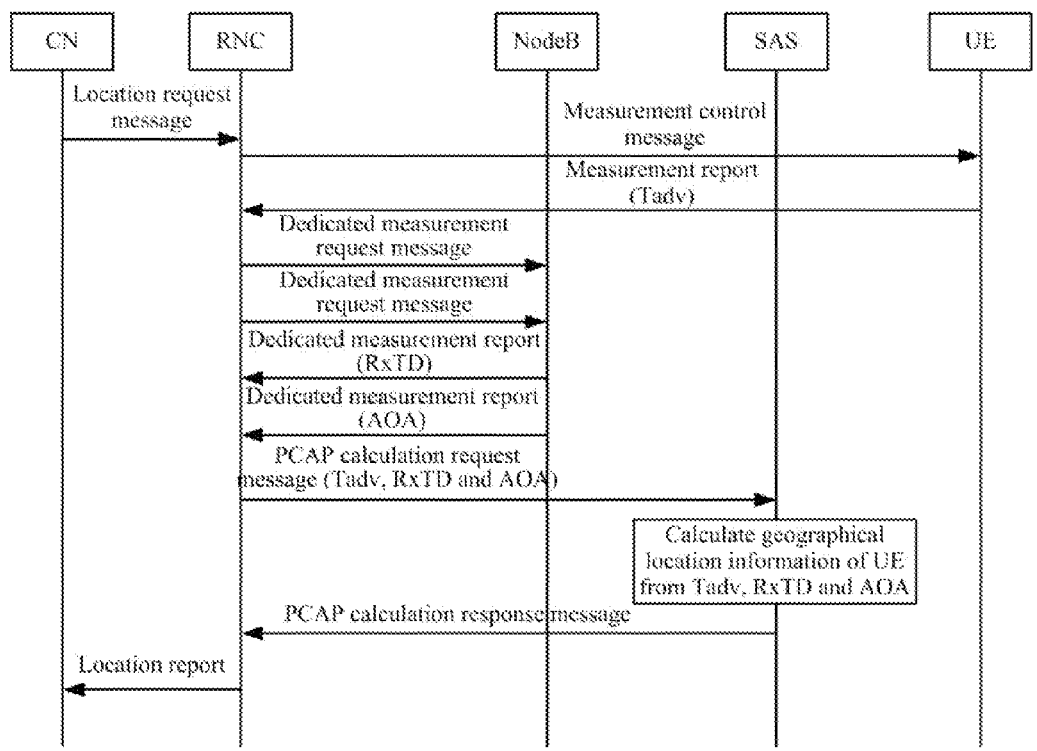
FIG. 2B illustrates a detailed flow chart of implementing the PCAP function in the TA+AOA position scheme in the prior art.
Figure 3:
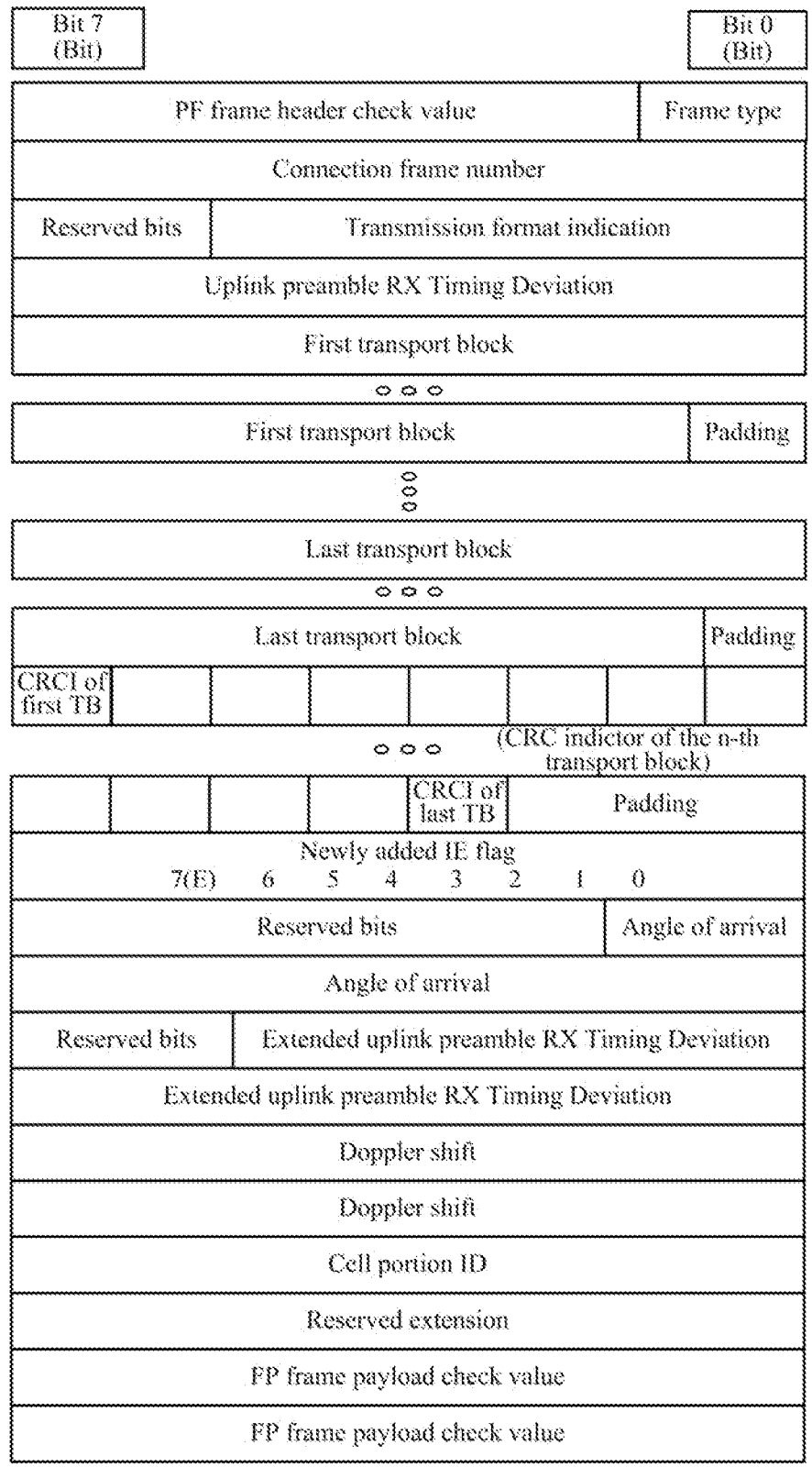
FIG. 3 illustrates the RACH FP format in the prior art.
Figure 5:
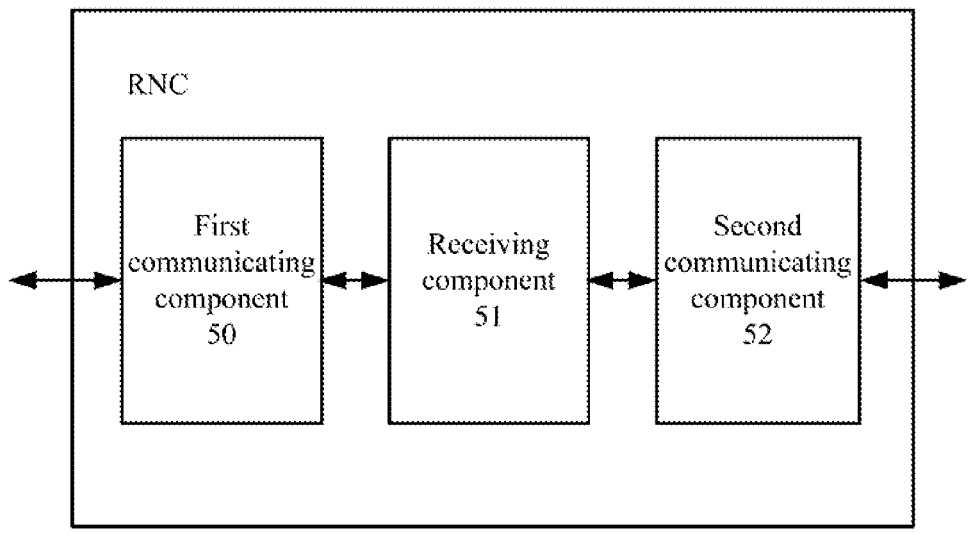
FIG. 5 illustrates a schematic diagram of the function structure of an RNC according to an embodiment of the present disclosure.

Referring to FIG. 5, in an embodiment of the present disclosure, an RNC includes a first communicating component 50, a receiving component 51 and a second communicating component 52, wherein:

The first communicating component 50 is configured, in response to a first request message transmitted by a Core Network (CN) for positioning of a mobile terminal, to transmit to a Node B serving the mobile terminal a second request message, for retrieving the number of identifiers of cell portions associated with the mobile terminal in a cell division result, wherein the cell division result includes a plurality of cell portions obtained by dividing the cell where the mobile terminal is currently located, according to a coverage pattern of the antennas group of the Node B;

A receiving component 51 is configured to receive the identifier of at least one cell portion associated with the mobile terminal sent by the Node B; and A second communicating component 52 is configured to transmit to a Stand-alone Serving Mobile Location Center (SAS) a Position Calculation Application Part (PCAP) calculation request message, carrying the identifier of the at least one cell portion, to enable the SAS to determine geographical location information of the mobile terminal, according to the identifier of the at least one cell portion.

Figure 6:
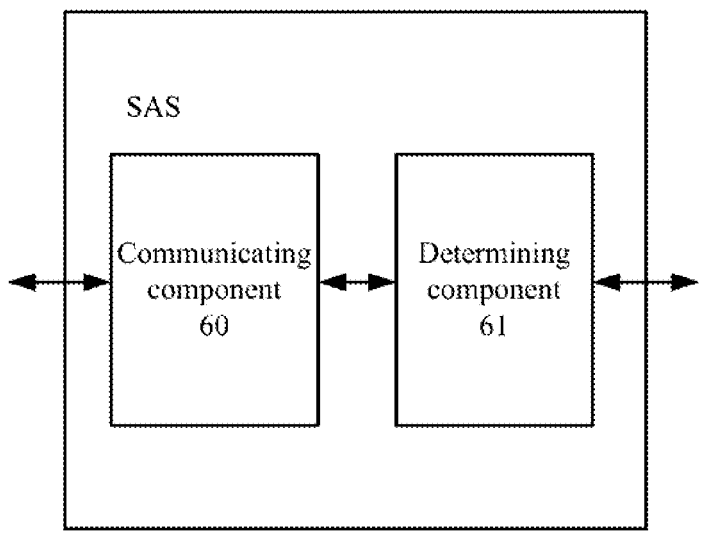
FIG. 6 illustrates a schematic diagram of the function structure of an SAS according to an embodiment of the present disclosure.

Referring to FIG. 6, in an embodiment of the present disclosure, an SAS includes a communicating component 60 and a determining component 61, wherein:

The communicating component 60 is configured to receive a Position Calculation Application Part (PCAP) calculation request message, transmitted by a Radio network controller (RNC), carrying the identifier of at least one cell portion associated with a mobile terminal in a cell division result, wherein the cell division result includes a plurality of cell portions obtained by dividing the cell where the mobile terminal is currently located, according to a coverage pattern of the antennas group of a Node B; and The determining component 61 is configured to determine geographical location information of the mobile terminal, according to the identifier of the at least one cell portion.

Figure 7:
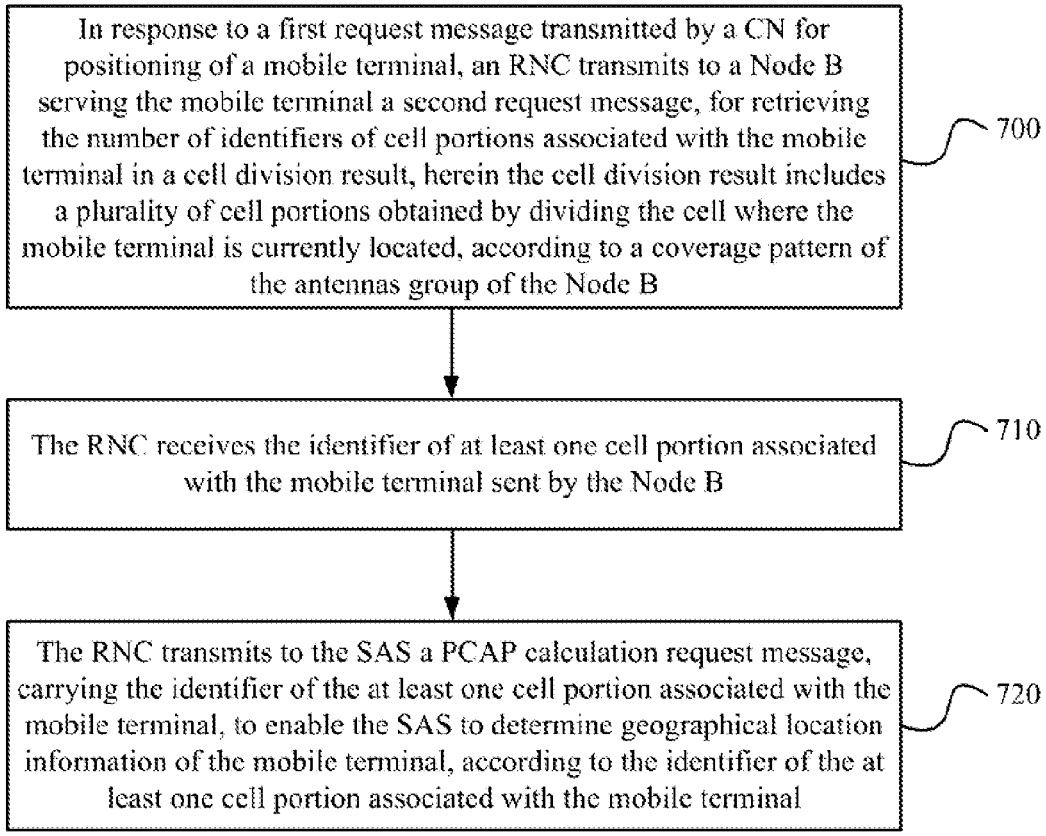
FIG. 7 illustrates a detailed flow chart of positioning a mobile terminal by an RNC according to an embodiment of the present disclosure.

Based upon the technical solution above, referring to FIG. 7, an embodiment of the present disclosure provides a method for positioning a mobile terminal by an RNC in the following particular flow:

Operation 700: In response to a first request message transmitted by a CN for positioning of a mobile terminal, an RNC transmits to a Node B serving the mobile terminal a second request message, for retrieving the number of identifiers of cell portions associated with the mobile terminal in a cell division result, wherein the cell division result includes a plurality of cell portions obtained by dividing the cell where the mobile terminal is currently located, according to a coverage pattern of the antennas group of the Node B;

In an embodiment of the present disclosure, the CN firstly transmits the first request message to the RNC, to trigger positioning of the mobile terminal, wherein the first request message requests is configured to position of the mobile terminal. Then the RNC transmits the second request message to the Node B serving the mobile terminal to be positioned, wherein the second request message requests is configured to indicate retrieving the number of identifiers of the cell portions associated with the mobile terminal in the cell division result.

An example will be described below where the mobile terminal to be positioned is A, the Node B serving Mobile Terminal A is B, and the serving cell of the mobile terminal is C, Cell C is divided into five cell portions including Cell portion C1, Cell portion C2, Cell portion C3, Cell portion C4 and Cell portion C5, wherein the cell portions associated with Mobile Terminal A are Cell portion C2, Cell portion C3 and Cell portion C4.

The CN transmits a first request message to the RNC to indicate positioning Mobile Terminal A, and the RNC transmits to the Node B (B) a second request message, for retrieving the number of identifiers of cell portions associated with the mobile terminal in a result of dividing Cell C, upon reception of the first request message, particularly by transmitting to the Node B (B) a request message, for retrieving the number of identifiers of the cell portions associated with the mobile terminal, wherein the number of identifiers of the cell portions associated with the mobile terminal may be different from the number of cell portions actually associated with the mobile terminal, that is, the retrieved number of identifiers of the cell portions associated with the mobile terminal, transmitted by the RNC to the Node B (B), may be two, three, four or five.

In an embodiment of the present disclosure, the CN firstly transmits the first request message to the RNC, to trigger positioning of the mobile terminal, herein the first request message requests is configured to position of the mobile terminal. Then the RNC transmits the second request message to the Node B serving the mobile terminal to be positioned, herein the second request message requests is configured to indicate retrieving the number of identifiers of the cell portions associated with the mobile terminal in the cell division result.

An example will be described below where the mobile terminal to be positioned is A, the Node B serving Mobile Terminal A is B, and the serving cell of the mobile terminal is C, Cell C is divided into five cell portions including Cell portion C1, Cell portion C2, Cell portion C3, Cell portion C4 and Cell portion C5, herein the cell portions associated with Mobile Terminal A are Cell portion C2, Cell portion C3 and Cell portion C4.

The CN transmits a first request message to the RNC to indicate positioning Mobile Terminal A, and the RNC transmits to the Node B (B) a second request message, for retrieving the number of identifiers of cell portions associated with the mobile terminal in a result of dividing Cell C, upon reception of the first request message, particularly by transmitting to the Node B (B) a request message, for retrieving the number of identifiers of the cell portions associated with the mobile terminal, herein the number of identifiers of the cell portions associated with the mobile terminal may be different from the number of cell portions actually associated with the mobile terminal, that is, the retrieved number of identifiers of the cell portions associated with the mobile terminal, transmitted by the RNC to the Node B (B), may be two, three, four or five.

Operation 710: The RNC receives the identifier of at least one cell portion associated with the mobile terminal sent by the Node B.

In an embodiment of the present disclosure, the number, sent by the Node B and received by the RNC, of the identifiers of the cell portions associated with the mobile terminal, is the same as the retrieved number, transmitted by the RNC to the Node B, of identifiers of the cell portions associated with the mobile terminal. If the retrieved number, transmitted by the RNC to the Node B, of identifiers of the cell portions associated with the mobile terminal is larger than the numbers of identifiers of the cell portions actually associated with the mobile terminal, then the Node B will send the identifiers of the cell portions unassociated with the mobile terminal to the RNC, wherein the cell portion unassociated with the mobile terminal refers to a cell portion in which received signal power of the mobile terminal is low or zero.

An example will be described below where the mobile terminal to be positioned is A, the Node B serving Mobile Terminal A is B, and the serving cell of the mobile terminal is C.

The CN transmits a first request message to the RNC, to indicate positioning of Mobile Terminal A, and the RNC transmits to the Node B (B) a second request message, for retrieving the number of identifiers of cell portions associated with the mobile terminal in a result of dividing Cell C, upon reception of the first request message, wherein Cell C can be divided into five cell portions including Cell portion C1, Cell portion C2, Cell portion C3, Cell portion C4 and Cell portion C5, according to a coverage pattern of the antennas group of the Node B, the cell portions associated with Mobile Terminal A are Cell portion C2, Cell portion C3, Cell portion C4 and Cell portion C5, and the retrieved number, transmitted by the RNC to the Node B, of identifiers of the cell portions associated with the mobile terminal may be smaller or larger than the number of cell portions actually associated with the mobile terminal, that is, the retrieved number, transmitted by the RNC to the Node B, of identifiers of the cell portions associated with the mobile terminal may be three or five; and then the RNC receives the identifier of at least one cell portion associated with the mobile terminal sent by the Node B, that is, the RNC may receive only the identifier of Cell portion C3 sent by the Node B (the retrieved number, transmitted by the RNC to the Node B, of identifiers of the cell portions associated with the mobile terminal is 1), or may receive only the identifier of Cell portion C4 sent by the Node B (the retrieved number, transmitted by the RNC to the Node B, of identifiers of the cell portions associated with the mobile terminal is 1), or may receive the identifiers of three cell portions including Cell portion C1, Cell portion C2 and Cell portion C3 sent by the Node B (the retrieved number, transmitted by the RNC to the Node B, of identifiers of the cell portions associated with the mobile terminal is 3), or may receive the identifiers of five cell portions including Cell portion C1, Cell portion C2, Cell portion C3, Cell portion C4 and Cell portion C5 sent by the Node B (the retrieved number, transmitted by the RNC to the Node B, of identifiers of the cell portions associated with the mobile terminal is 5).

Operation 720: The RNC transmits to the SAS a PCAP calculation request message, carrying the identifier of the at least one cell portion associated with the mobile terminal, to enable the SAS to determine geographical location information of the mobile terminal, according to the identifier of the at least one cell portion associated with the mobile terminal.

In an embodiment of the present disclosure, the RNC transmits to the SAS the PCAP calculation request message, carrying the identifier of the at least one cell portion associated with the mobile terminal, via an Iupc interface, so that the SAS determines geographical location information of the mobile terminal according to the identifier of the at least one cell portion associated with the mobile terminal.

In an embodiment of the present disclosure, if the RNC receives the identifier of one cell portion associated with the mobile terminal sent by the Node B, then the SAS determines the retrieved geographical location information of the cell portion as the geographical location information of the mobile terminal.

In an embodiment of the present disclosure, if the RNC receives the identifiers of at least two of the cell portions associated with the mobile terminal sent by the Node B, then the SAS determines the geographical location information of the mobile terminal, according to the at least two cell portions associated with the mobile terminal, particularly in the following two approaches:

First Approach:

Operation A1: The SAS configures geographical location information for each of the at least two cell portions associated with the mobile terminal.

In an embodiment of the present disclosure, the geographical location information of each cell portion configured by the SAS at least includes: the longitude of the cell portion, the latitude of the cell portion, the height of the antennas of the Node B to the ground (where the antennas are deployed outdoors) or the floor where the antennas of the Node B are deployed (where the antennas are deployed indoors).

Operation A2: The SAS determines the cell portion with the highest received signal code power, among the at least two cell portions associated with the mobile terminal, and determines the geographical location information of the cell portion as the geographical location information of the mobile terminal.

In an embodiment of the present disclosure, the SAS determines the cell portion with the highest received signal code power, among the at least two cell portions associated with the mobile terminal, and takes the cell portion as the serving area of the mobile terminal, and further then inquires the geographical location information configured for the cell portion, and determines the geographical location information of the cell portion as the geographical location information of the mobile terminal.

For example, a serving cell B of Mobile Terminal A is divided into three cell portions including Cell portion B1, Cell portion B2 and Cell portion B3, all of which are associated with Mobile Terminal A, according to a coverage pattern of the antennas group of a serving Node B (C) of Mobile Terminal A, and received signal code power of Cell portion B1 is X1, received signal code power of Cell portion B2 is X2, and received signal code power of Cell portion B3 is X3. The SAS configures the three cell portions of Cell B including Cell portion B1, Cell portion B2 and Cell portion B3 respectively with geographical location information, wherein the geographical location information of each cell portion at least includes: the height of the antennas of the Node B to the ground (where the antennas are deployed outdoors) or the floor where the antennas of the Node B are deployed (where the antennas are deployed indoors). Then the SAS determines the received signal power of the three cell portions of the cell B in an order of X1>X2>X3, that is, the cell portion with the highest received signal code power is B1, and determines the geographical location information of Cell portion B1 as the geographical location information of the mobile terminal.

Second Approach:

Operation B1: The SAS configures geographical location information for each of the at least two cell portions associated with the mobile terminal.

In an embodiment of the present disclosure, the geographical location information of each cell portion configured by the SAS at least includes: the height of the antennas of the Node B to the ground (where the antennas are deployed outdoors) or the floor where the antennas of the Node B are deployed (where the antennas are deployed indoors).

Operation B2: The SAS determines the highest one of received signal code power of the at least two cell portions associated with the mobile terminal, and then calculates the difference between the highest received signal code power and the received signal code power corresponding to each cell portion, and selects N cell portions with their differences below a preset threshold, and if the value of N is 1, then the geographical location information of the selected cell portion is determined as the geographical location information of the mobile terminal; and if the value of N is larger than 1, then the geographical location information of the mobile terminal is determined, according to the weights of the respective selected cell portions and the corresponding geographical location information In an embodiment of the present disclosure, the SAS determines the highest one of the received signal code power of the at least two cell portions associated with the mobile terminal, and then calculates the difference between the highest received signal code power and the received signal code power corresponding to each cell portion, and selects N cell portions with their differences below a preset threshold, wherein the preset threshold is configured by an Operation and Management (O&M) to be larger than or equal to 0. If the value of N is 1, then the geographical location information of the selected cell portion is determined as the geographical location information of the mobile terminal; and if the value of N is larger than 1, then the geographical location information of the mobile terminal is determined, according to the weights of the respective selected cell portions and the corresponding geographical location information, particularly as follows: the geographical location information of the mobile terminal is the sum of the products of the geographical location information of the respective selected cell portions and the corresponding weights, wherein each of the weights of the cell portions is related to each of the received signal code power of the cell portions, that is, there is a greater weight at higher received signal code power, and also the sum of the weights of the respective selected cell portions is 1.

For example, a serving cell B of Mobile Terminal A is divided into five cell portions including Cell portion B1, Cell portion B2, Cell portion B3, Cell portion B4 and Cell portion B5, according to a coverage pattern of the antennas group of a Node B (C) serving Mobile Terminal A; received signal code power of Cell portion B1 is 0, received signal code power of Cell portion B2 is 200, received signal code power of Cell portion B3 is 300, received signal code power of Cell portion B4 is 400, and received signal code power of Cell portion B5 is 500; the preset threshold is 300 (TH=300), wherein the preset threshold is configured by the O&M; and the weight of Cell portion B1 is 0%, the weight of Cell portion B2 is 15%, the weight of Cell portion B3 is 20%, the weight of Cell portion B4 is 25%, and the weight of Cell portion B5 is 40%. The SAS configures the five cell portions of Cell B, including Cell portion B1, Cell portion B2, Cell portion B3, Cell portion B4 and Cell portion B5, respectively with geographical location information, wherein the geographical location information of each cell portion at least includes: the height of the antennas of the Node B to the ground (where the antennas are deployed outdoors) or the floor where the antennas of the Node B are deployed (where the antennas are deployed indoors). The SAS determines the highest one of the received signal code power of the five cell portions in the cell division result as 500, calculates the difference between the highest received signal code power of 500 and the received signal code power corresponding to each cell portion, selects four cell portions with their differences below the preset threshold of 300 as Cell portion B2, Cell portion B3, Cell portion B4 and Cell portion B5, and determines the geographical location information of the mobile terminal, according to the weights of the four selected cell portions and the corresponding geographical location information, particularly as follows:

The geographical location information of the mobile terminal=the geographical location information of B2×15%+ the geographical location information of B3×20%+the geographical location information of B4×25%+the geographical location information of B5×40%.

In an embodiment of the present disclosure, the SAS determines the geographical location information of the mobile terminal, according to the identifier of the at least one cell portion associated with the mobile terminal, and transmits a PCAP calculation response message, carrying the geographical location information of the mobile terminal to the RNC, via the Iupc interface, and the RNC transmits the geographical location information of the mobile terminal to the CN, upon reception of the PCAP calculation response message.

Figure 8:
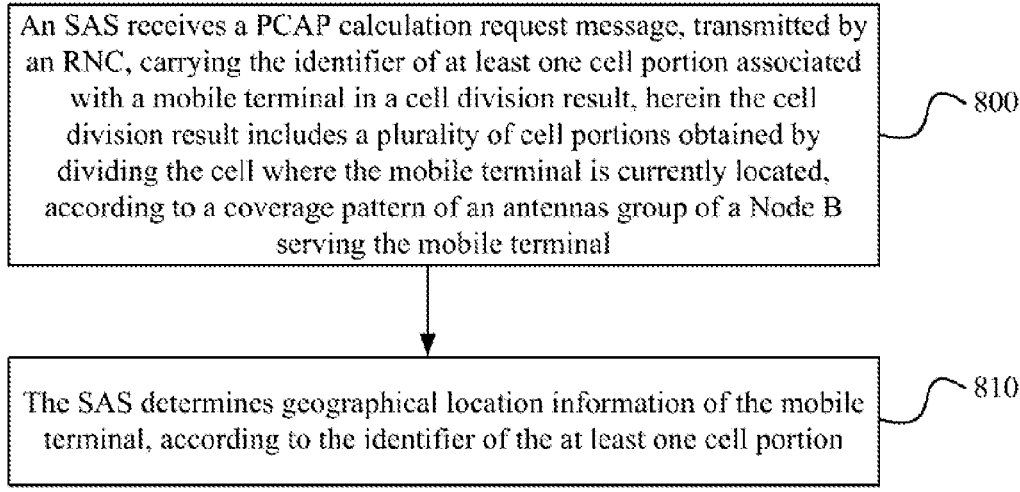
FIG. 8 illustrates a detailed flow chart of positioning a mobile terminal by an SAS according to an embodiment of the present disclosure.

Based upon the technical solution above, referring to FIG. 8, an embodiment of the present disclosure proposes a method for positioning a mobile terminal by an SAS in the following particular flow:

Operation 800: An SAS receives a PCAP calculation request message, transmitted by an RNC, carrying the identifier of at least one cell portion associated with a mobile terminal in a cell division result, wherein the cell division result includes a plurality of cell portions obtained by dividing the cell where the mobile terminal is currently located, according to a coverage pattern of an antennas group of a Node B serving the mobile terminal.

In an embodiment of the present disclosure, the SAS receives the PCAP calculation request message, transmitted by the RNC, carrying the identifier of the at least one cell portion associated with the mobile terminal in the cell division result, via an Iupc interface.

Operation 810: The SAS determines geographical location information of the mobile terminal, according to the identifier of the at least one cell portion.

In an embodiment of the present disclosure, if the SAS receives the PCAP calculation request message, transmitted by the RNC, carrying the identifier of one cell portion associated with the mobile terminal in the cell division result, then the SAS determines retrieved geographical location information of the cell portion associated with the mobile terminal as the geographical location information of the mobile terminal.

In an embodiment of the present disclosure, if the SAS receives the PCAP calculation request message, transmitted by the RNC, carrying the identifiers of at least two cell portions associated with the mobile terminal in the cell division result, then the SAS determines the geographical location information of the mobile terminal, according to the identifiers of the at least two cell portions particularly, in the following two approaches:

First Approach:

Operation C1: The SAS configures geographical location information for each of the at least two cell portions associated with the mobile terminal in the cell division result.

In an embodiment of the present disclosure, the respective cell portions in the cell division result are a result of dividing the cell, where the mobile terminal is currently located, according to the coverage pattern of the antennas group of the Node B serving the mobile terminal, and the cell portions, into which the cell is divided, include cell portions associated with the mobile terminal and cell portions unassociated with the mobile terminal. The geographical location information configured for each cell portion at least includes: the height of the antennas of the Node B to the ground (where the antennas are deployed outdoors) or the floor where the antennas of the Node B are deployed (where the antennas are deployed indoors).

Operation C2: The SAS determines the cell portion with the highest received signal code power, among the at least two cell portions associated with the mobile terminal, and determines the geographical location information of the cell portion as the geographical location information of the mobile terminal.

In an embodiment of the present disclosure, the SAS determines the cell portion with the highest received signal code power, among some of the at least two cell portions associated with the mobile terminal in the cell division result, and then takes the cell portion as the serving area of the mobile terminal, and further inquires the geographical location information configured for the cell portion, and determines the geographical location information of the cell portion as the geographical location information of the mobile terminal.

Second Approach:

Operation D1: The SAS configures geographical location information for each of the at least two cell portions associated with the mobile terminal.

In an embodiment of the present disclosure, the respective cell portions in the cell division result are a result of dividing the cell, where the mobile terminal is currently located, according to the coverage pattern of the antennas group of the Node B serving the mobile terminal, and the cell portions, into which the cell is divided, include cell portions associated with the mobile terminal and cell portions unassociated with the mobile terminal. The geographical location information configured for each cell portion at least includes: the height of the antennas of the Node B to the ground (where the antennas are deployed outdoors) or the floor where the antennas of the Node B are deployed (where the antennas are deployed indoors).

Operation D2: The SAS determines the highest one of received signal code power of the at least two cell portions associated with the mobile terminal, and then calculates the difference between the highest received signal code power and the received signal code power corresponding to each cell portion, and selects N cell portions with their differences below a preset threshold, and if the value of N is 1, then the SAS determines the geographical location information of the selected cell portion as the geographical location information of the mobile terminal; and if the value of N is larger than 1, then the SAS determines the geographical location information of the mobile terminal, according to the weights of the respective selected cell portions and the corresponding geographical location information.

In an embodiment of the present disclosure, the SAS determines the highest one of the received signal code power of the at least two cell portions associated with the mobile terminal, and then calculates the difference between the highest received signal code power and the received signal code power corresponding to each cell portion, and selects N cell portions with their differences below a preset threshold, wherein the preset threshold is configured by an O&M to be larger than or equal to 0. If the value of N is 1, then the geographical location information of the selected cell portion is determined as the geographical location information of the mobile terminal; and if the value of N is larger than 1, then the geographical location information of the mobile terminal is determined, according to the weights of the respective selected cell portions and the corresponding geographical location information, particularly as follows: the geographical location information of the mobile terminal is the sum of the products of the geographical location information of the respective selected cell portions and the corresponding weights, wherein the sum of the weights of the respective selected cell portions is 1.

In summary, in embodiments of the present disclosure, in response to the first request message transmitted by the CN for positioning of the mobile terminal, the RNC transmits to the Node B serving the mobile terminal the second request message, for retrieving the number of identifiers of cell portions associated with the mobile terminal in a cell division result, wherein the cell division result includes multiple cell portions obtained by dividing the cell, where the mobile terminal is currently located, according to a coverage pattern of the antennas group of the Node B; the RNC receives the identifier of at least one cell portion associated with the mobile terminal sent by the Node B; and the RNC transmits to an SAS a PCAP calculation request message carrying the identifier of the at least one cell portion, so that the SAS determines geographical location information of the mobile terminal, according to the identifier of the at least one cell portion, to thereby position the mobile terminal precisely.

A structure and a processing approach of an RNC according to an embodiment of the present disclosure will be described below, with reference to a preferred hardware structure thereof.

An RNC according to an embodiment of the present disclosure includes a memory, a transceiver and at least one processor, wherein:

The memory is configured to store position related information of a mobile terminal, e.g., retrieved geographical location information of the mobile terminal.

The processor is configured, in response to a first request message transmitted by a CN for positioning of a mobile terminal, to trigger the transceiver to transmit, to a Node B serving the mobile terminal, a second request message for retrieving the number of identifiers of cell portions associated with the mobile terminal in a cell division result, wherein the cell division result includes multiple cell portions obtained by dividing the cell where the mobile terminal is currently located, according to a coverage pattern of an antennas group of the Node B;

The transceiver is further configured to receive the identifier of at least one cell portion associated with the mobile terminal sent by the Node B; and The processor is further configured to trigger the transceiver to transmit, to an SAS, a PCAP calculation request message, carrying the identifier of the at least one cell portion, to enable the SAS to determine geographical location information of the mobile terminal, according to the identifier of the at least one cell portion.

In a preferred embodiment, if the transceiver receives the identifier of one cell portion associated with the mobile terminal sent by the Node B, then the processor triggers the transceiver to transmit, to the SAS, a PCAP calculation request message, carrying the identifier of the cell portion, to enable the SAS to determine retrieved geographical location information of the cell portion associated with the mobile terminal as the geographical location information of the mobile terminal.

In another preferred embodiment, if the transceiver receives the identifiers of at least two cell portions associated with the mobile terminal sent by the Node B, then the processor triggers the transceiver to transmit, to the SAS, a PCAP calculation request message carrying the identifiers of the at least two cell portions, to enable the SAS to determine the cell portion with the highest received signal code power among the at least two cell portions, and determine geographical location information of the cell portion as the geographical location information of the mobile terminal.

In still another preferred embodiment, if the transceiver receives the identifiers of at least two cell portions associated with the mobile terminal sent by the Node B, then the processor triggers the transceiver to transmit, to the SAS, a PCAP calculation request message carrying the identifiers of the at least two cell portions, to enable the SAS to determine the highest one of received signal code power of the at least two cell portions associated with the mobile terminal, and then calculate the difference between the highest received signal code power and the received signal code power corresponding to each cell portion, and select N cell portions with their differences below a preset threshold, and if the value of N is 1, then determine the geographical location information of the selected cell portion as the geographical location information of the mobile terminal; and if the value of N is larger than 1, then determine the geographical location information of the mobile terminal, according to the weights of the respective selected cell portions and the corresponding geographical location information.

In an embodiment, the transceiver is further configured:

after transmitting the PCAP calculation request message carrying the identifier of the at least one cell portions to the SAS, to receive the geographical location information of the mobile terminal fed back by the SAS, and to transmit the geographical location information of the mobile terminal to the CN.

A structure and processing of an SAS according to an embodiment of the present disclosure will be described below with reference to a preferred hardware structure thereof.

An SAS according to an embodiment of the present disclosure includes a memory, a transceiver and at least one processor, wherein:

The memory is configured to store position related information of respective mobile terminals, e.g., geographical location information configured for the respective mobile terminals.

The transceiver is configured to receive a PCAP calculation request message, transmitted by an RNC, carrying the identifier of at least one cell portion associated with a mobile terminal in a cell division result, wherein the cell division result includes multiple cell portions obtained by dividing the cell where the mobile terminal is currently located, according to a coverage pattern of an antennas group of the Node B; and The processor is configured to determine geographical location information of the mobile terminal, according to the identifier of the at least one cell portion received by the transceiver.

In a preferred embodiment, the transceiver is configured:

If the transceiver receives the PCAP calculation request message, transmitted by the RNC, carrying the identifier of one cell portion associated with the mobile terminal in the cell division result, to determine retrieved geographical location information of the cell portion associated with the mobile terminal as the geographical location information of the mobile terminal.

In another preferred embodiment, the transceiver is configured:

If the transceiver receives the PCAP calculation request message, transmitted by the RNC, carrying the identifiers of at least two cell portions associated with the mobile terminal in the cell division result, to determine the cell portion with the highest received signal code power among the at least two cell portions, and to determine geographical location information of the cell portion as the geographical location information of the mobile terminal.

In still another preferred embodiment, the transceiver is configured:

If the transceiver receives the PCAP calculation request message, transmitted by the RNC, carrying the identifiers of at least two cell portions associated with the mobile terminal in the cell division result, to determine the highest one of received signal code power of the at least two cell portions associated with the mobile terminal, to calculate the difference between the highest received signal code power and the received signal code power corresponding to each cell portion, and to select N cell portions with their differences below a preset threshold, and if the value of N is 1, then to determine the geographical location information of the selected cell portion as the geographical location information of the mobile terminal; and if the value of N is larger than 1, then to determine the geographical location information of the mobile terminal, according to the weights of the respective selected cell portions and the corresponding geographical location information.

In an embodiment of the present disclosure, the processor is further configured:

after the geographical location information of the mobile terminal is determined according to the identifier of the at least one cell portion, to trigger the transceiver to feed the geographical location information of the mobile terminal back to the RNC, and to transmit the geographical location information of the mobile terminal to a CN through the RNC.

Those skilled in the art shall appreciate that embodiments of the present disclosure may be embodied as a method, a system or a computer program product. Therefore the present disclosure can be embodied in the form of an all-hardware embodiment, an all-software embodiment or an embodiment of software and hardware in combination. Furthermore the present disclosure can be embodied in the form of a computer program product embodied in one or more computer useable storage mediums (including but not limited to a disk memory, a CD-ROM, an optical memory, etc.) in which computer useable program codes are contained.

The present disclosure has been described in a flow chart and/or a block diagram of the method, the device (system) and the computer program product according to the embodiments of the present disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the present disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the present disclosure.

Evidently those skilled in the art can make various modifications and variations to the present disclosure without departing from the spirit and scope of the present disclosure. Thus the present disclosure is also intended to encompass these modifications and variations thereto so long as the modifications and variations come into the scope of the claims appended to the present disclosure and their equivalents.

What is claimed is:

1. A method for positioning a mobile terminal, comprising:
in response to a first request message transmitted by a Core Network, CN, for positioning of a mobile terminal, transmitting, by a Radio Network Controller, RNC, to a Node B, serving the mobile terminal a second request message for retrieving a number of identifiers of cell portions associated with the mobile terminal in a cell division result, wherein the cell division result comprises a plurality of cell portions obtained by dividing the cell where the mobile terminal is currently located, according to a coverage pattern of an antennas group of the Node B;
receiving, by the RNC, an identifier of at least one cell portion associated with the mobile terminal sent by the Node B; and
transmitting, by the RNC, to a Stand-alone Serving Mobile Location Center, SAS, a Position Calculation Application Part, PCAP, calculation request message carrying the identifier of the at least one cell portion, to enable the SAS to determine geographical location information of the mobile terminal according to the identifier of the at least one cell portion;
wherein when the RNC receives identifiers of at least two cell portions associated with the mobile terminal sent by the Node B, the RNC transmits to the SAS the PCAP calculation request message carrying the identifiers of the at least two cell portions, to enable the SAS to determine highest one of received signal code power of the at least two cell portions associated with the mobile terminal, and then to calculate difference between the highest received signal code power and the received signal code power corresponding to each cell portion, and to select N cell portions with their differences below a preset threshold, and if value of N is 1, then to determine geographical location information of selected cell portion as the geographical location information of the mobile terminal; and if the value of N is larger than 1, then to determine the geographical location information of the mobile terminal as a sum of the products of geographical location information of respective selected cell portions and corresponding weights.

2. The method according to claim 1, wherein when the RNC receives an identifier of one cell portion associated with the mobile terminal sent by the Node B, the RNC transmits to the SAS the PCAP calculation request message carrying the identifier of the cell portion, to enable the SAS to determine retrieved geographical location information of the cell portion associated with the mobile terminal as the geographical location information of the mobile terminal.

3. The method according to claim 1, wherein when the RNC receives identifiers of at least two cell portions associated with the mobile terminal sent by the Node B, the RNC transmits to the SAS the PCAP calculation request message carrying the identifiers of the at least two cell portions, to enable the SAS to determine the cell portion with the highest received signal code power among the at least two cell portions, and to determine geographical location information of the cell portion as the geographical location information of the mobile terminal.

4. The method according to claim 1, wherein after the PCAP calculation request message carrying the identifier of the at least one cell portions is transmitted by the RNC to the SAS, the RNC receives the geographical location information of the mobile terminal fed back by the SAS and transmits the geographical location information of the mobile terminal to the CN.

5. A method for positioning a mobile terminal, comprising:
receiving, by a Stand-alone Serving Mobile Location Center, SAS, a Position Calculation Application Part, PCAP, calculation request message, transmitted by a Radio Network Controller, RNC, carrying an identifier of at least one cell portion associated with a mobile terminal in a cell division result, wherein the cell division result comprises a plurality of cell portions obtained by dividing the cell where the mobile terminal is currently located, according to a coverage pattern of an antennas group of a Node B; and
determining, by the SAS, geographical location information of the mobile terminal according to the identifier of the at least one cell portion;
wherein when the SAS receives the PCAP calculation request message, transmitted by the RNC, carrying identifiers of at least two cell portions associated with the mobile terminal in the cell division result, the SAS determines highest one of received signal code power of the at least two cell portions associated with the mobile terminal, and then calculates difference between the highest received signal code power and the received signal code power corresponding to each cell portion, and selects N cell portions with their differences below a preset threshold, and if value of N is 1, then determines geographical location information of selected cell portion as the geographical location information of the mobile terminal; and if the value of N is larger than 1, then determines the geographical location information of the mobile terminal as a sum of the products of geographical location information of respective selected cell portions and corresponding weights.

6. The method according to claim 5, wherein when the SAS receives the PCAP calculation request message, transmitted by the RNC, carrying an identifier of one cell portion associated with the mobile terminal in the cell division result, the SAS determines retrieved geographical location information of the cell portion associated with the mobile terminal as the geographical location information of the mobile terminal.

7. The method according to claim 5, wherein when the SAS receives the PCAP calculation request message, transmitted by the RNC, carrying identifiers of at least two cell portions associated with the mobile terminal in the cell division result, the SAS determines the cell portion with the highest received signal code power among the at least two cell portions, and determines geographical location information of the cell portion as the geographical location information of the mobile terminal.

8. The method according to claim 5, wherein after the geographical location information of the mobile terminal is determined, according to the identifier of the at least one cell portion, the SAS feeds the geographical location information of the mobile terminal back to the RNC, and transmits the geographical location information of the mobile terminal to the CN through the RNC.

9. A device for positioning a mobile terminal, comprising:
a first communicating component configured, in response to a first request message transmitted by a Core Network, CN, for positioning of a mobile terminal, to transmit to a Node B serving the mobile terminal a second request message, for retrieving a number of identifiers of cell portions associated with the mobile terminal in a cell division result, wherein the cell division result includes a plurality of cell portions obtained by dividing the cell where the mobile terminal is currently located, according to a coverage pattern of an antennas group of the Node B;
a receiving component configured to receive the identifier of at least one cell portion associated with the mobile terminal sent by the Node B; and
a second communicating component configured to transmit to a Stand-alone Serving Mobile Location Center, SAS, a Position Calculation Application Part, PCAP, calculation request message carrying the identifier of the at least one cell portion, to enable the SAS to determine geographical location information of the mobile terminal, according to the identifier of the at least one cell portion;
wherein the second communicating component is configured:
when the receiving component receives identifiers of at least two cell portions associated with the mobile terminal sent by the Node B, to transmit to the SAS the PCAP calculation request message carrying the identifiers of the at least two cell portions, to enable the SAS to determine highest one of received signal code power of the at least two cell portions associated with the mobile terminal, and then to calculate difference between the highest received signal code power and the received signal code power corresponding to each cell portion, and to select N cell portions with their differences below a preset threshold, and if value of N is 1, then to determine geographical location information of selected cell portion as the geographical location information of the mobile terminal; and if the value of N is larger than 1, then to determine the geographical location information of the mobile terminal as a sum of the products of geographical location information of respective selected cell portions and corresponding weights.

10. The device according to claim 9, wherein the second communicating component is configured:
when the receiving component receives an identifier of one cell portion associated with the mobile terminal sent by the Node B, to transmit to the SAS the PCAP calculation request message carrying the identifier of the cell portion, to enable the SAS to determine retrieved geographical location information of the cell portion associated with the mobile terminal as the geographical location information of the mobile terminal.

11. The device according to claim 9, wherein the second communicating component is configured:

when the receiving component receives identifiers of at least two cell portions associated with the mobile terminal sent by the Node B, to transmit to the SAS the PCAP calculation request message carrying the identifiers of the at least two cell portions, to enable the SAS to determine the cell portion with the highest received signal code power among the at least two cell portions, and to determine geographical location information of the cell portion as the geographical location information of the mobile terminal.

12. The device according to claim 9, wherein the second communication is further configured:

after the PCAP calculation request message carrying the identifier of the at least one cell portions is transmitted to the SAS, to receive the geographical location information of the mobile terminal fed back by the SAS, and to transmit the geographical location information of the mobile terminal to the CN.

13. A device for positioning a mobile terminal, comprising:

a communicating component configured to receive a Position Calculation Application Part, PCAP, calculation request message, transmitted by a Radio Network Controller, RNC, carrying an identifier of at least one cell portion associated with a mobile terminal in a cell division result, wherein the cell division result comprises a plurality of cell portions obtained by dividing the cell where the mobile terminal is currently located, according to a coverage pattern of an antennas group of a Node B; and a determining component configured to determine geographical location information of the mobile terminal according to the identifier of the at least one cell portion;

wherein the determining component is configured:

when the communicating component receives the PCAP calculation request message, transmitted by the RNC, carrying identifiers of at least two cell portions associated with the mobile terminal in the cell division result, to determine highest one of received signal code power of the at least two cell portions associated with the mobile terminal, and then to calculate difference between the highest received signal code power and the received signal code power corresponding to each cell portion, and to select N cell portions with their differences below a preset threshold, and if value of N is 1, then to determine geographical location information of selected cell portion as the geographical location information of the mobile terminal; and if the value of N is larger than 1, then to determine the geographical location information of the mobile terminal as a sum of the products of geographical location information of respective selected cell portions and corresponding weights.

14. The device according to claim 13, wherein the determining component is configured:

when the communicating component receives the PCAP calculation request message, transmitted by the RNC, carrying an identifier of one cell portion associated with the mobile terminal in the cell division result, to determine retrieved geographical location information of the cell portion associated with the mobile terminal as the geographical location information of the mobile terminal.

15. The device according to claim 13, wherein the determining component is configured:

when the communicating component receives the PCAP calculation request message, transmitted by the RNC, carrying identifiers of at least two cell portions associated with the mobile terminal in the cell division result, to determine the cell portion with the highest received signal code power among the at least two cell portions, and to determine geographical location information of the cell portion as the geographical location information of the mobile terminal.

16. The device according to claim 13, wherein the communicating component is further configured:

after the geographical location information of the mobile terminal is determined, according to the identifier of the at least one cell portion, to feed the geographical location information of the mobile terminal back to the RNC, and to transmit the geographical location information of the mobile terminal to the CN through the RNC.

* * * * *